United States Patent [19]

Wirth

[11] Patent Number: 5,078,015
[45] Date of Patent: Jan. 7, 1992

[54] BALANCE AND DYNAMOMETER

[75] Inventor: Johannes Wirth, Zurich, Switzerland

[73] Assignee: Wirth Gallo Messtechnik AG, Zurich, Switzerland

[21] Appl. No.: 459,794

[22] PCT Filed: Jun. 20, 1989

[86] PCT No.: PCT/CH89/00114

§ 371 Date: Feb. 20, 1990

§ 102(e) Date: Feb. 20, 1990

[87] PCT Pub. No.: WO90/01147

PCT Pub. Date: Feb. 8, 1990

[30] Foreign Application Priority Data

Jul. 18, 1988 [CH] Switzerland ............... 02758/88

[51] Int. Cl.$^5$ .................. G01L 1/04; G01L 1/26
[52] U.S. Cl. ............... 73/862.62; 73/862.64; 73/862.59
[58] Field of Search ........... 73/862.62, 862.64, 862.59, 73/DIG. 1; 177/210 FP, 225, 229

[56] References Cited

U.S. PATENT DOCUMENTS 3,897,681 8/1975 Meier ................... 73/862.59
4,678,050 7/1987 Wirth et al. ............ 177/229

FOREIGN PATENT DOCUMENTS 0025807 4/1981 European Pat. Off. .
0071652 2/1983 European Pat. Off. .
3301117 9/1983 European Pat. Off. .
3336250 4/1984 European Pat. Off. .
0150584 8/1985 European Pat. Off. .
0195876 10/1986 European Pat. Off. .

Primary Examiner—Charles A. Ruehl
Attorney, Agent, or Firm—Johnson & Gibbs

[57] ABSTRACT

An elastic force reducing balance and dynamometer comprising a primary spring and a secondary spring which are stressed by bending when an input force is exerted. In at least one of the primary and secondary springs, at least one bar is formed which is stressed, at least partially, by torsion. In this manner, the overall creep of the balance and dynamometer is substantially reduced or eliminated.

25 Claims, 3 Drawing Sheets

BALANCE AND DYNAMOMETER

BACKGROUND OF THE INVENTION

1. Field of the Invention

This invention relates to a balance and an elastic force reducing dynamometer. More particularly, this invention relates to a balance and elastic force reducing dynamometer having primary and secondary elastic force transfer springs connected in parallel.

2. Background of the Invention

Balances and dynamometers having primary and secondary elastic force transfer springs are described, for example, in European Patents B1 16,238 and B1 25,807 and West German Patent DE Gbm. G 86 33 612.6. In such devices, the total force being measured by the device is distributed onto two springs connected in parallel. The parallel connected springs include a first or primary spring and a secondary spring. The primary spring diverts the major portion of an input force $F_i$ directly to the frame of the device and to a second spring. A force sensor for converting the measured force into an electrical value, is installed in series with the second spring. As most force sensors are characterized by a specific elastic compliance, the force sensor may be viewed as yet another spring. Thus, the secondary spring is comprised of the second spring together with the serially connected force sensor.

In the simplest configuration, the primary and secondary springs are similarly connected such that the application of an input force $F_i$ produces the same deflection in both springs. In this case, the input force would be distributed between the two springs according to their respective degree of rigidity. Accordingly, the reduction ratio U may be calculated according to the following formula:

$$U = \frac{F_o}{F_i} = \frac{k_2}{k_1 + k_2} = \frac{c_1}{c_1 + c_2} \quad (1)$$

where:

$F_i$ is the input force;

$F_o$ represents the portion of $F_i$ acting on the force sensor;

$k_1$ is the force constant or rigidity of the primary spring;

$k_2$ is the force constant or rigidity of the secondary spring including the force sensor;

$c_1$ is the inverse of $k_1$ or the compliance of the primary spring; and $c_2$ is the inverse of $k_2$ or the compliance of the secondary spring including the force sensor.

If the compliance of the second spring is designated as $c_{21}$ and the compliance of the force sensor as $c_{22}$, then U may be expressed as:

$$U = \frac{c_1}{c_1 + c_{21} + c_{22}} \quad (2)$$

In other configurations, the primary and secondary springs are separately connected but are still coupled together such that the deflection of one spring is proportional to that of the other. If all compliances and forces on the common connections are reduced mathematically, equations (1) and (2) are equally applicable.

Hooke's law provides that the force applied to an elastic body is proportional to the extension or compression undergone by that body. In accordance with Hooke's law, the compliances contained in equations (1) and (2) are constants so long as their temperature dependence is not taken into consideration. This relationship may be expressed in mathematical terms as follows:

$$\frac{\Delta L}{\Delta F} = c$$

where:

L is the extension or deflection of the elastic body;

F is the force being applied; and c is a constant.

It should be noted, however, that Hooke's law is merely a good approximation and not a positive relationship. Several deviations from this approximation are known in practice. For example, the delayed elasticity of the spring material leads to a time dependent, delayed deflection of the spring body fabricated from such material. This phenomena is generally referred to as "creep" and has been well documented in the literature. See, for example, A. S. Nowick and B. S. Berry: *Anelastic Relaxation in Crystalline Solids*, Academic Press, New York and London, 1972. The term "relative creep" has been used to designate the ratio between the time dependent and time independent components of a compliance. The value of relative creep varies with the nature of the material and, for each material, with the temperature and type of stress involved, e.g. compressive stress vs. shear stress. Values for relative creep above 1/1000 have been measured in the 0° C. to 40° C. temperature range.

Because the phenomena of creep has an adverse affect on the precision of balances and dynamometers, various solutions have been proposed for compensating and/or reducing the influence of creep on weight measurements. For example, in Swiss Patent A5 656,225, a solution was proposed that required all deflection points to be made of the same material. It was also required that the change in flexural stress be equal everywhere. Because of these requirements, the proposed solution was less than satisfactory. First, a measuring system is typically made using a material different from the material used for the deflecting springs. Moreover, the proposed solution is based on the assumption that creep proceeds non-linearly with flexural stress, an assumption that is not necessarily correct.

It is an object of this invention to provide an elastic force reducing balance and dynamometer having primary and secondary elastic force transfer springs connected in parallel.

It is another object of this invention to provide an elastic force reducing balance and dynamometer which compensates for the relative creep of the primary and secondary springs.

SUMMARY OF THE INVENTION

A balance and an elastic force reducing dynamometer is comprised of primary and secondary elastic force transferring springs connected in parallel. When an input force to be measured is applied to the balance and dynamometer, the primary and secondary springs are stressed by bending. At least one of the primary and secondary spring further includes a bar formed by a pair of opposing, offset notches. When the input force is applied to the balance and dynamometer, the spring which includes the bar is at least partially stressed by torsion, thereby compensating for creep of the primary and secondary springs relative to each other.

BRIEF DESCRIPTION OF THE DRAWINGS

The present invention may be better understood and its numerous objects and advantages will become more apparent to those skilled in the art by reference to the attached drawings where:

FIG. 1b is a side view of the balance and dynamometer of FIG. 1a;

FIG. 4b is a top view of FIG. 4a;

FIG. 6b is a front view of FIG. 6a;

FIG. 7b is a front view of FIG. 7a.

DETAILED DESCRIPTION OF THE INVENTION

So that the present invention may be better understood, certain physical relationships helpful to an understanding of the invention shall now be described.

Recalling equation (2), it may be seen that the reduction ratio U, and thus the measurement result of the balance and dynamometer, need not creep to the same degree as the primary or secondary springs. If the relative creep of the primary and secondary springs have equal amounts and time constants, U is a constant and not subject to creep. However, since the force sensor is part of the secondary spring, the compliances and creep properties of various materials used to make the force sensor will enter into the determination of U. In the present invention, the overall creep is strongly reduced, if not completely offset, despite the creep of the force sensor.

Each of the participating compliances can be depicted by a constant portion and by a time-dependent portion:

$$c_j = c_{jo} + c_j(t), \tag{3}$$

or with the relative creep as $$\epsilon = \frac{c_j(t)}{c_{jo}}, \tag{4}$$

$$c_j = c_{jo}(1 + \epsilon_j) \tag{5}$$

Inserting this in equation (1) yields $$U = \frac{c_{10}(1 + \epsilon_1)}{c_{10}(1 + \epsilon_1) + c_{20}(1 + \epsilon_2)} \tag{6}$$

and in view of equation (2):

$$\epsilon_2 = \frac{c_{210}}{c_{20}} \cdot \epsilon_{21} + \frac{c_{220}}{c_{20}} \cdot \epsilon_{22} \tag{7}$$

Further if $$U_o = \frac{c_{10}}{c_{10} + c_{20}} \tag{8}$$

is assumed with the prerequisite that $\epsilon << 1$, which must apply directly in this case, equation (6) obtains the form $$U = U_o \left[ 1 + \frac{c_{20}}{c_{10} + c_{20}} (\epsilon_1 - \epsilon_2) \right] \tag{9}$$

Since $c_{10} << c_{20}$ applies generally for the balance and dynamometer under consideration, equation (9) in good approximation can be written as:

$$U = U_o[1 + (\epsilon_1 - \epsilon_2)] \tag{10}$$

Given that $\epsilon_j$ of each of the different materials being considered, also differs according to stress type, i.e. tensile/compressive stress ($\sigma$) or shear stress ($\tau$), an aspect of the present invention requires that at least a section of one of the primary and secondary springs is constructed and stressed as a torsion spring. In this manner, it is possible to have the difference $\epsilon_1 - \epsilon_2$ be less than, equal to or greater than zero without sacrificing accuracy.

Figure 1A:
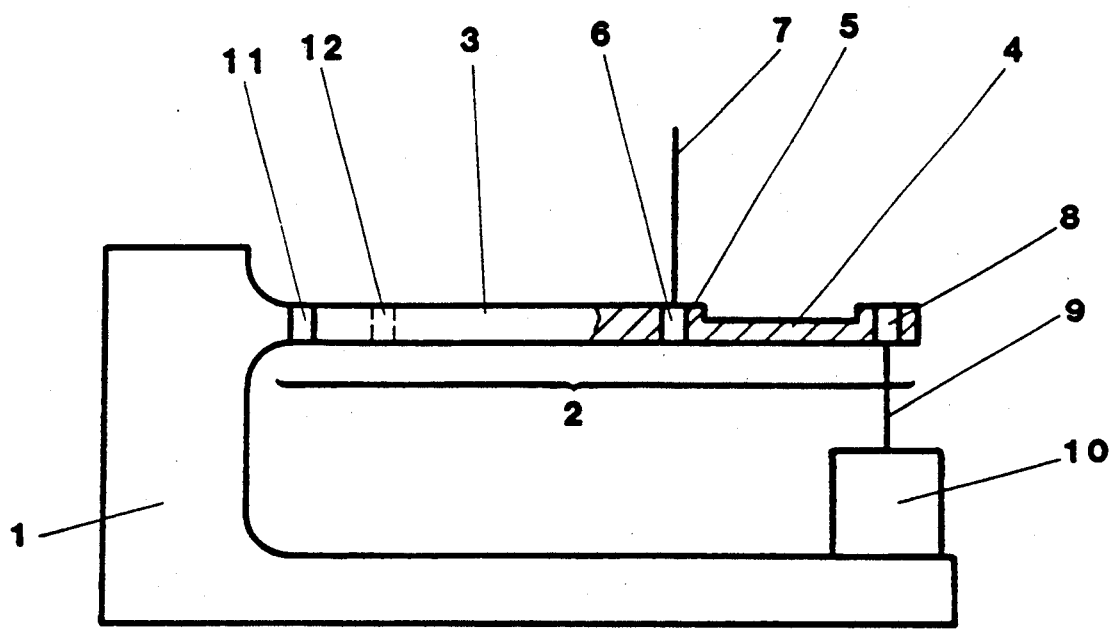
FIG. 1a is a top view of a balance and dynamometer constructed in accordance with the teachings of the present invention.

Referring first to FIG. 1a, a top view of a balance and dynamometer constructed in accordance with the teachings of the present invention may now be seen. The balance and dynamometer includes a rigid frame 1 and an elastic arm 2 connected tightly to the frame 1. The arm 2 is divided into a first, essentially parallelepiped section 3 directly connected to the frame 1 and a second, essentially parallelepiped section 4 significantly thinner than and fastened to the section 3. An aperture 5 is formed on the right end of the section 3. A first clamping piece 6 is inserted into the aperture 5 and a first tension wire 7, whose additional guide is not shown in the drawings, extends upwardly from the first clamping piece 6 perpendicular to the plane of the arm 2. Similarly, a second tension wire 9 extending perpendicularly downward from the right end of the section 4 is attached to the right end of the section 4 by a second clamping piece 8. A force sensor 10 is connected at one end to the tension wire 9 and at the other end to the frame 1.

Figure 1B:
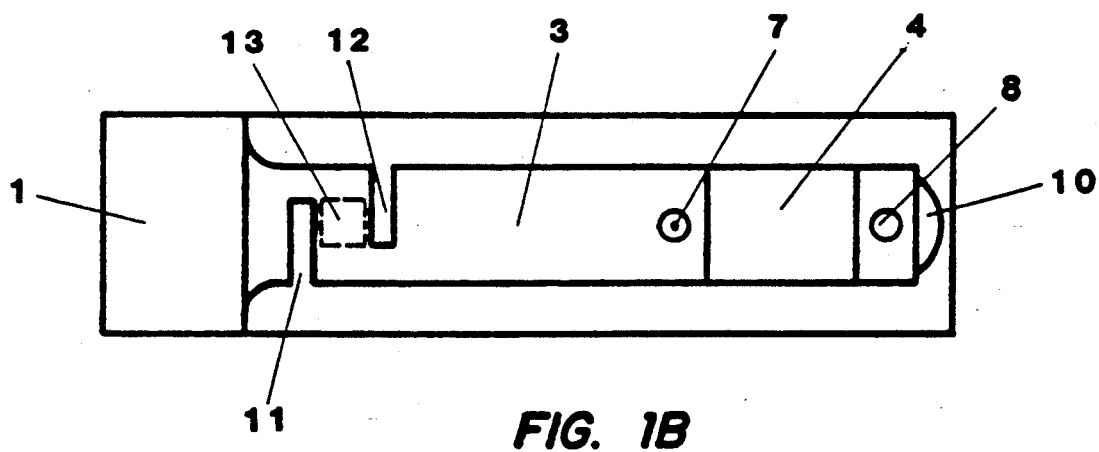

Referring next to FIG. 1b, two opposing, offset notches 11, 12, each perpendicular to the axis of the arm 2, are provided close to the left end of the section 3, thereby forming a bar 13 drawn in phantom in FIG. 1b, between the notches 11, 12. When an input force to be determined is introduced through the wire 7, the input force would be distributed between the sections 3 and 4 according to their degrees of respective rigidity.

Since the bar 13 is stressed by torsion and is elastic with respect to such stress, the section 3 acts in part as a plate spring and in part as a shear or "torsion" spring. Due to its thickness, the section 3 receives the main portion of the input force. Under the action of this force, the right end of section 3 is displaced upward and is twisted in a counter clockwise direction with respect to the representation in FIG. 1a. The left end of the section 4, which is connected tightly with section 3, experiences the same position changes.

Because the right end of section 4 is restrained by the tension wire 9, the section 4 cannot undergo the corresponding position changes. However, the section 4 as a deflecting spring will be deformed and will receive a part of the input force. Due to the compliance of force sensor 10, the right end of section 4 is displaced slightly upward with its twisting being received by tension wire 9.

According to the general description, section 3 is a first elastic force transfer spring; section 4 is a second elastic force transfer spring; and force sensor 10, which is connected in series to the second spring, may be viewed as a measuring spring. If the first elastic force transfer spring is designated as the primary spring, the second elastic force transfer spring, together with the measuring spring may be designated as the secondary spring.

The relative creep due to tensile/compressive stress of the sections 3, 4, fabricated from one piece and consisting of the same material, is lower than that of force sensor 10. In addition, the relative creep of the secondary spring lies somewhere between that of the section 4 and the force sensor 10 and is thus higher than that of the section 3. Hence, the secondary spring would tend to overcompensate for the relative creep of the primary spring.

In the embodiment shown in FIGS. 1A and 1B, the relative creep of the material from which the arm 2 is fabricated, is smaller for tensile/compressive stress than for shear stress. The bar 13 formed between notches 11, 12 is stressed by torsion. Essentially, the primary spring constructed according to the present invention has a deflecting spring portion extending from the aperture 5 to the notch 12 and a torsion spring portion consisting of bar 13. By suitable selection of the ratio between flexural and torsion compliance of the primary spring, the relative creep of the primary spring can be made equal to that of the secondary spring. This determination is affected by the position, width and depth of the notches 11, 12 in proportion to the length, width and thickness of the section 3.

Figure 2:
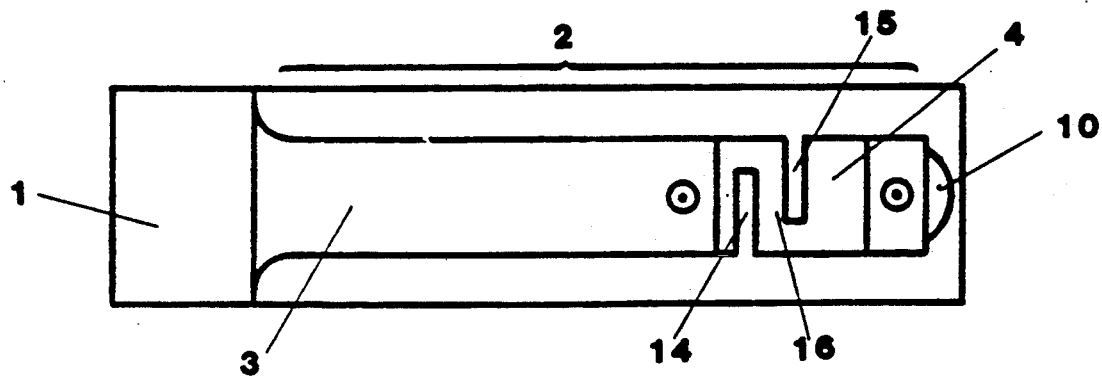
FIG. 2 is a side view of a second embodiment of the present invention.

Referring next to FIG. 2, a second embodiment of the balance and dynamometer of the present invention may now be seen. In this embodiment, the relative creep due to tensile/compressive stress, of the force sensor 10 is smaller than that of the material from which arm 2 is fabricated. As before, the relative creep of this material is smaller for tensile/compressive stress than for shear stress. The section 3, or first spring, constructed according to the present invention is a pure deflecting spring. A bar 16 is formed between the notches 14, 15 near the left end of the section 4, or second spring, in a manner analogous to the bar 13 illustrated in FIG. 1. Hence, it is the secondary spring which has a deflecting spring portion and a torsion spring portion. Again, the relative creeps of the primary and secondary springs can be equalized so that the reduction ratio U, and consequently the measurement result is free from creep.

Figure 3:
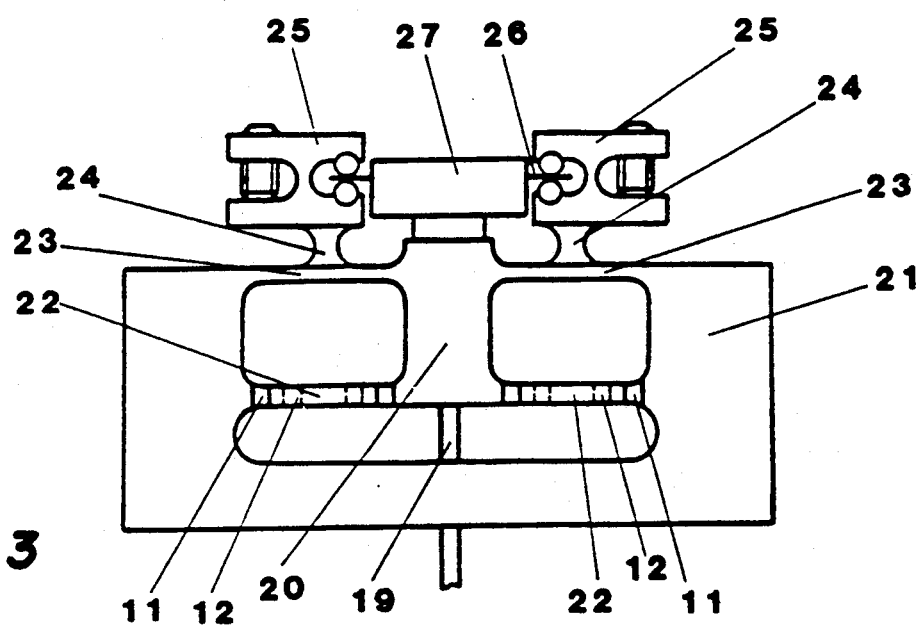
FIG. 3 is a side view of a third embodiment of the present invention.

Referring next to FIG. 3, a third embodiment of the balance and dynamometer of the present invention may now be seen. The present embodiment depends from a model apparatus described in West German Patent Publication DE Gbm. G 86 33 612.6. In this embodiment, the balance and dynamometer includes a frame 21 attached to a platform (not shown). Two first deflecting or "principal" springs 22 and two second deflection springs 23 are secured to the frame 21. A strut 24 connects each deflecting springs 23 to a clamping head 25. Each end of a measuring wire 26 is fastened to one of the clamping heads 25. An excitation system 27 is mounted along the measuring wire 26. The primary deflecting springs 22 and the second deflecting springs 23 are mounted on a central block 20. A post 19 receives a force to be measured. According to the present embodiment of the invention, the first deflecting springs 22 are the primary spring; the second deflecting springs 23, together with the struts 24 and the clamping heads 25, form the second spring; and the measuring wire 26 forms the measuring spring connected in series with the second spring. Again, the second spring and measuring spring comprise the secondary spring. The primary spring has notches 11, 12 which serve the same purpose as described in connection with FIG. 1.

Figure 4A:
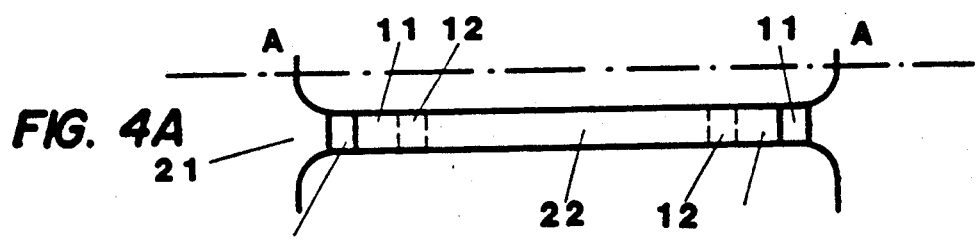
FIG. 4a is an enlarged fragmentary side view of the deflecting spring illustrated in FIG. 3.
Figure 4B:
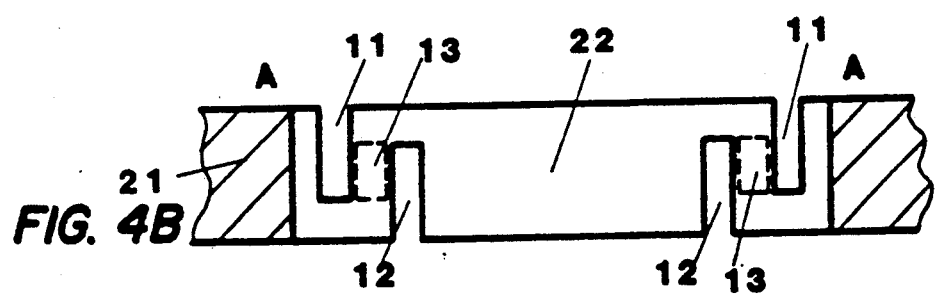

Referring next to FIGS. 4a and 4b, the left one of the first deflecting springs 22 illustrated in FIG. 3 may now be seen in greater detail. As before, a bar 13 formed between the notches 11, 12 is stressed by torsion. By varying the width, depth and position of the notches 11, 12 the relative creep of the primary and secondary springs can be equalized.

Figure 5:
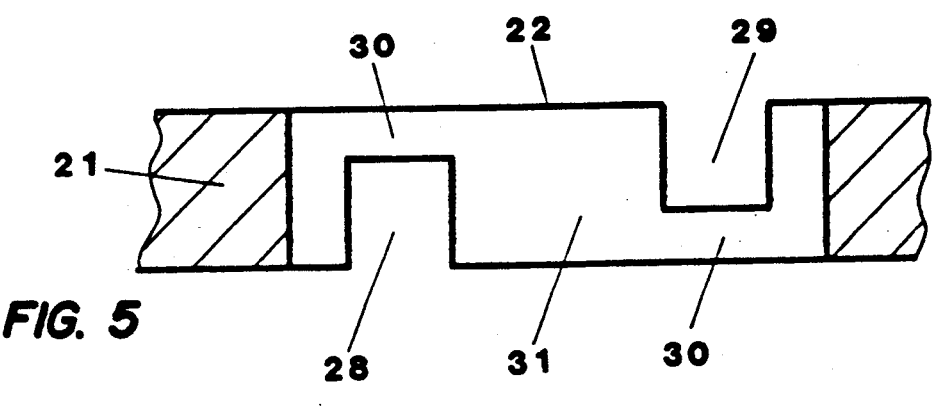
FIG. 5 is a top view of a second embodiment of the deflecting spring of FIGS. 4a-b.

Referring next to FIG. 5, a top view of a second embodiment of the deflecting spring 22 of FIGS. 4a and 4b may now be seen. Here, two wide notches 28, 29, replace the notches 11, 12 illustrated in FIG. 4b. Deflecting bars 30, 31 are thus formed by the wide notches 28, 29. In this embodiment, the two deflecting spring pairs 22, 23 are components of a parallel guide system. As a result, the central block 20 and the frame 21 are offset parallel to each other and thus cannot twist. As a result, the deflecting springs 22 are stressed by torsion while the deflecting bars 30, 31 formed are stressed both by bending and torsion. The torsion stress is distributed onto the deflecting bars 30, 31 according to the width, depth, and position of the wide notches 28, 29.

Figure 6A:
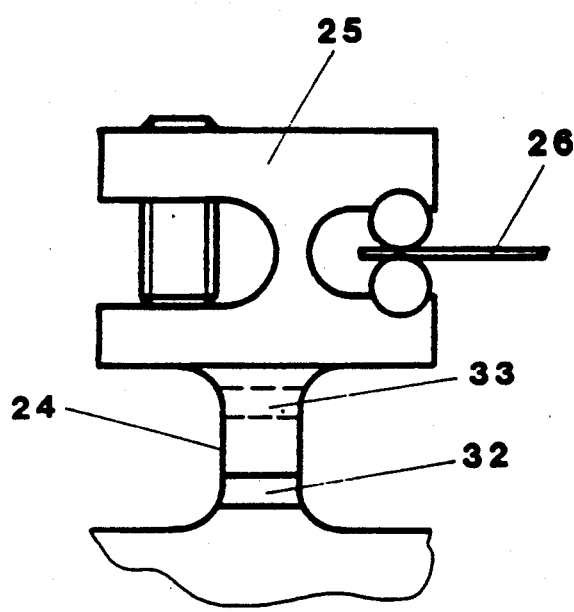
FIG. 6a is an enlarged, fragmentary side view of an alternative embodiment of FIG. 3
Figure 6B:
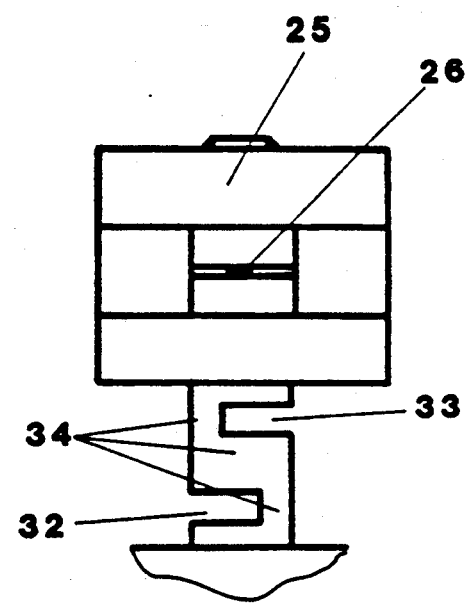

Referring next to FIGS. 6a and 6b, an alternative embodiment of the strut illustrated in FIG. 3 may now be seen. In FIG. 6a, the clamping head 25 and strut 24 may be seen in side view and in FIG. 6b, in front view. In accordance with the embodiment of the invention shown herein, the strut 24 has two horizontal notches 32, 33. Bars 34 formed by notches 32, 33 are stressed by both bending and torsion. Thus, while the strut 24 in FIG. 3 is stressed only by bending, in the embodiment according to FIGS. 6A and 6B, the strut 24 is stressed both by bending both by bending and torsion. Consequently, the secondary spring which includes strut 24 receives the creep portion due to torsion stress.

Figure 7A:
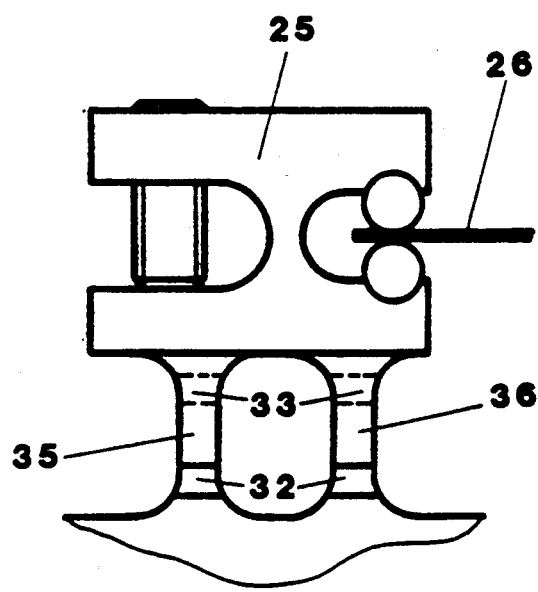
FIG. 7a is a side view of a second embodiment of the strut illustrated in FIGS. 6a-b.
Figure 7B:
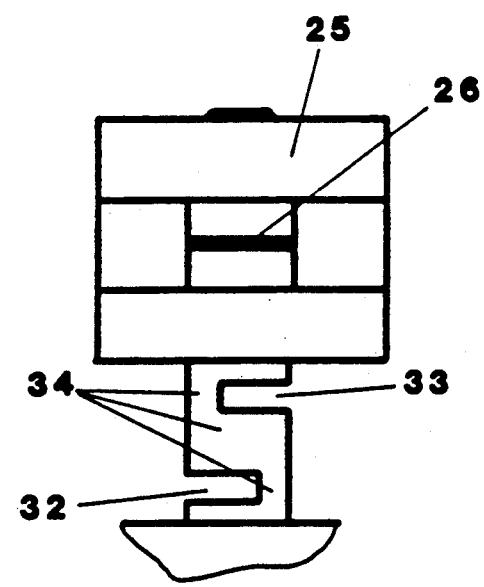

Referring next to FIGS. 7A and 7B, another alternative embodiment of the present invention may now be seen. In FIGS. 7A and 7B, the strut 24 of FIGS. 6A and 6B has been replaced by two struts 35, 36. These struts are shown in side view in FIG. 7a and in perspective view in FIG. 7b. Similar to the embodiment illustrated in FIGS. 6a–b, notches 32, 33 form three bars 34 which are stressed both by bending and torsion and produce a creep portion to compensate for the creep of the primary spring relative to that of the secondary spring.

Thus, there has been described and illustrated herein a balance and dynamometer having a primary and a secondary spring stressed by bending in reaction to a force being measured, and where at least one of the primary and secondary springs has a bar which is stressed by torsion for compensation of the relative creep of the primary and secondary springs. However, those skilled in the arts will recognize that many modifications and variations besides those specifically mentioned may be made in the techniques described herein without departing substantially from the spirit and scope of the present invention. Accordingly, it should be clearly understood that the form of the invention described herein is exemplary only, and is not intended as a limitation on the scope of the present invention.

What is claimed is:

1. A balance and an elastic force reducing dynamometer comprising:
   a primary spring for elastic force transfer;
   a secondary spring for elastic force transfer, said primary and secondary springs connected in parallel and stressed by bending when an input force is exerted on said balance and dynamometer;
   at least one of said primary and secondary springs further comprising at least one bar which is stressed by torsion when said input force is exerted;
   wherein said spring including said at least one bar, compensates for creep of said primary spring relative to said secondary spring.

2. Balance and dynamometer according to claim 1 wherein only said primary spring includes at least one bar stressed by torsion.

3. Balance and dynamometer according to claim 2 wherein each one of said at least one bar is formed by two opposing, offset notches.

4. Balance and dynamometer according to claim 1 wherein only said secondary spring includes at least one bar stressed by torsion.

5. Balance and dynamometer according to claim 4 wherein each one of said at least one bar is formed by two opposing, offset notches.

6. A balance and elastic force reducing dynamometer comprising:
   a frame;
   an arm divided into a first spring section connected to said frame and a second spring section connected to said first spring section;
   means for introducing an input force to said arm; and
   means for measuring said input force, said means for measuring said input force connected at one end to said arm and at the other end to said frame; and
   at least one of said first and second spring sections is comprised of a deflecting spring portion and a torsion spring portion.

7. Balance and dynamometer according to claim 6 wherein only said first spring section is comprised of a deflecting spring portion and a torsion spring portion.

8. Balance and dynamometer according to claim 7 wherein said first spring section further comprises a first end connected to said frame and a second end connected to said second spring section and wherein said torsion spring portion includes said first end.

9. Balance and dynamometer according to claim 7 wherein said torsion spring portion is formed by two opposing, offset notches.

10. Balance and dynamometer according to claim 9 wherein said first spring section further comprises a first end connected to said frame and a second end connected to said second spring section and wherein said torsion spring portion includes said first end.

11. Balance and dynamometer according to claim 6 wherein only said second spring section spring section is comprised of a deflecting spring portion and a torsion spring portion.

12. Balance and dynamometer according to claim 11 wherein said second spring section further comprises a first end connected to said first spring section and a second end connected to said means for measuring said input force and wherein said torsion spring portion includes said first end.

13. Balance and dynamometer according to claim 12 wherein said torsion spring portion is formed by two opposing, offset notches.

14. Balance and dynamometer according to claim 6 wherein both of said first and second spring sections are comprised of a deflecting spring portion and a torsion spring portion, said first spring section further comprising a first end connected to said frame and a second end connected to said second spring section and wherein said torsion spring portion of said first spring section includes said first end.

15. Balance and dynamometer according to claim 6 wherein said first spring section is thicker than said second spring section.

16. A balance and elastic force reducing dynamometer comprising:
   a frame;
   a first pair of deflecting springs secured to said frame;
   a second pair of deflecting springs secured to said frame;
   a first clamping head supported by a first one of said second deflecting spring pair;
   a second clamping head supported by a second one of said second deflecting spring pair;
   a first strut for connecting said first clamping head to said first one of said second deflecting spring pair;
   a second strut for connecting said second clamping head to said second one of said second deflecting spring pair;
   means for introducing an input force to said first and second deflecting spring pairs; and
   a measuring spring for measuring said input force, said measuring spring interposed between said first and second clamping heads;
   wherein each one of said first deflecting spring pair further comprises at least one bar stressed by torsion when said input force is exerted.

17. Balance and dynamometer according to claim 16 wherein each one of said at least one bar is formed by two opposing offset notches.

18. Balance and dynamometer according to claim 16 wherein each one of said first deflecting spring pair includes three bars formed by two wide, opposing, offset notches.

19. Balance and dynamometer according to claim 16 wherein said first and second struts each include at least one bar stressed by torsion when said input force is exerted.

20. Balance and dynamometer according to claim 19 wherein each bar corresponding to said first and second struts are formed by two opposing offset notches.

21. Balance and dynamometer according to claim 19 wherein each of said first and second struts further include three bars formed by two wide, opposing, offset notches.

22. A balance and elastic force reducing dynamometer comprising:
   a frame;
   a first pair of deflecting springs secured to said frame;
   a second pair of deflecting springs secured to said frame;

a first clamping head supported by a first one of said second deflecting spring pair;

a second clamping head supported by a second one of said second deflecting spring pair;

a first strut for connecting said first clamping head to said first one of said second deflecting spring pair;

a second strut for connecting said second clamping head to said second one of said second deflecting spring pair;

means for introducing an input force to said first and second deflecting spring pairs; and a measuring spring for measuring said input force, said measuring spring interposed between said first and second clamping heads;

wherein each of said first and second struts further comprises at least one bar stressed by torsion when said input force is exerted.

23. Balance and dynamometer according to claim 22 wherein each of said at least one bar is formed by two opposing, offset notches.

24. A balance and an elastic force reducing dynamometer comprising:

a frame;

a central block portion;

means for applying a force to be measured by said dynamometer to said central block portion;

a first pair of deflecting springs, each one of said first pair of springs supported between said frame and said central block portion;

a second pair of deflecting springs, each one of said second pair of springs supported between said frame and said central block portion;

a first clamping head mounted on a first one of said first pair of deflecting springs;

a second clamping head mounted on a second one of said second pair of plate springs;

means for measuring said input force mounted between said first and second clamping heads;

a first pair of struts for mounting said first wire clamp on said first one of said second pair of plate springs; and a second pair of struts for mounting said second wire clamp on said second one of said second pair of plate springs;

wherein each one of said first and second pair of struts further include at least one bar stressed by torsion when said input force is exerted.

25. Balance and dynamometer according to claim 24 wherein said second pair of deflecting springs, said first and second pairs of struts, said first and second clamping heads and said means for measuring said input force are connected in series with each other and the combination thereof is connected in parallel with said first pair of deflecting springs.

* * * * *

UNITED STATES PATENT AND TRADEMARK OFFICE
CERTIFICATE OF CORRECTION

PATENT NO. : 5,078,015
DATED : January 7, 1992
INVENTOR(S) : Johannes Wirth

It is certified that error appears in the above-indentified patent and that said Letters Patent is hereby corrected as shown below:

Col. 2 Line 20
Add underline under words --See--

Col. 2 Line 20
Add underline under words --Anelastic Relaxation in Crystalline Solids--

Col. 6 Line 50
Delete 2nd "both by bending" (duplicate)

Col. 8 Line 10
Delete "Comprising" and insert --comprises--

Signed and Sealed this

Eighth Day of June, 1993

Attest:

MICHAEL K. KIRK

*Attesting Officer*    *Acting Commissioner of Patents and Trademarks*